United States Patent [19]

Campagnolo

[11] Patent Number: 4,486,184
[45] Date of Patent: Dec. 4, 1984

[54] FREE-WHEEL FOR BICYCLES

[75] Inventor: Tullio Campagnolo, Vicenza, Italy

[73] Assignee: Campagnolo S.p.A., Vicenza, Italy

[21] Appl. No.: 413,453

[22] Filed: Aug. 31, 1982

[30] Foreign Application Priority Data

Sep. 22, 1981 [IT] Italy .............................. 23004/81[U]

[51] Int. Cl.³ ............................................ F16H 55/30
[52] U.S. Cl. .................................... 474/165; 192/64; 384/547
[58] Field of Search ............... 474/165, 160, 198, 199; 192/64; 308/189 R, 190–192, 207 R, 216

[56] References Cited

U.S. PATENT DOCUMENTS 1,035,421  8/1912  Coppins .............................. 308/191
3,554,340  1/1971  Shimano et al. ...................... 192/64
4,102,215  7/1978  Nagano et al. .................. 474/165 X
4,324,323  4/1982  Campagnolo .................. 474/160 X Primary Examiner—James A. Leppink
Assistant Examiner—Thuy M. Bui
Attorney, Agent, or Firm—Young & Thompson

[57] ABSTRACT

In a free-wheel for bicycles comprising an inner body integral with the wheel hub and an outer body carrying the chain drive sprockets, rolling on the inner body through two sets of balls, the seat for one of the sets is formed between a shoulder of the inner body and an adjustment cone screwed on the inner body. The cone is engaged with the shoulder through opposite conical centering surfaces, formed on the adjusting head of the cone and directly on the shoulder.

2 Claims, 2 Drawing Figures

FREE-WHEEL FOR BICYCLES

BACKGROUND OF THE INVENTION

This invention concerns an improved free-wheel mechanism for bicycles, in particular improvements in the adjustment system of such a mechanism.

It is known that the free-wheels to be asembled on the rear driving wheel of bicycles are mechanisms comprising an inner body integral with the wheel hub and an outer body carrying the chain drive sprockets of the bicycle, pedal-driven, said outer body being assembled rolling on the inner body through two sets of balls, positioned circumferentially, housed in suitable seats of the two bodies. It is also known that, for good operation of the free-wheels, it is very important to be able to adjust the position of the outer body with respect to the inner one in the simplest, most precise way, in both the longitudinal direction of the wheel axxis, and in the centering direction with respect to this axis.

The means of adjustment normally used consist of some flat-faced spacing rings of various thicknesses, placed between the flat-faced head of an adjustment "cone"—which forms part of the seat of one of the sets of balls, and which is screwed on the inner body of the free-wheel—and a shoulder, also flat-faced, obtained on said inner body and projecting from the same.

As this type of assembly permits an adjustment practically only in the axial direction, its precision, as regards the centering of the parts on the axis of rotation, is rather unsatisfactory. Working imprecisions, in fact, come into play e.g. the faults of parallelism between the faces of the spacers, the lack of squareness of the opposite faces of the cone and shoulder with the axis of the device and the lack of coupling precision of the threading of the cone with that of the inner body, which do not permit that precise centering that is desirable between the parts.

The purpose of this invention is to eliminate these drawbacks and to provide a free-wheel, with easy and at the same time, very precise adjustment, in both the axial and the centering direction with substantial improvements in the quality of the device compared to those of the prior art.

SUMMARY OF THE INVENTION

This invention therefore concerns a free-wheel for bicycle wheels, of the type comprising an inner body integral with the wheel hub and an outer body carrying the chain drive sprockets, rolling on the inner body through two circumferential sets of balls, the seat for one of which comprises a cone screwed on the inner body, ajustable with respect to a shoulder of the same body, characterized by the fact that said cone and said shoulder are in mutual engagement according to over mutually cooperating conical surfaces. The conical surfaces cooperating for adjustment are preferably positioned one on the head of the cone and the other directly on the shoulder of the inner body.

As may easily be seen, this arrangement achieves a perfect adjustment of centering on the axis of rotation, of the two cooperating parts, but obviously does not permit axial adjustment, which may be actuated, according to the invention, using adjustment cones, of slightly different axial measurements, selected on each occasion according to the adjustment requirements.

It should be noted that, from the production point of view, to produce a series of adjustment cones of different axial measurements is substantially equivalent to producing a single cone of standard axial measurement and various spacers of different axial dimensions. From the point of view of assembly—during which perfect adjustment is obtained by testing spacers or cones of different axial measurements, instead of measuring tolerances with precision instruments, thereby wasting more time—, it is clearly simpler to have to try to assemble a single piece, i.e. the adjustment cone in its different measurements, rather than two pieces, i.e. the standard cone and the different spacers.

BRIEF DESCRIPTION OF THE DRAWINGS

The invention is illustrated in the enclosed drawings, in which.

DESCRIPTION OF THE PREFERRED EMBODIMENT

Figure 1:
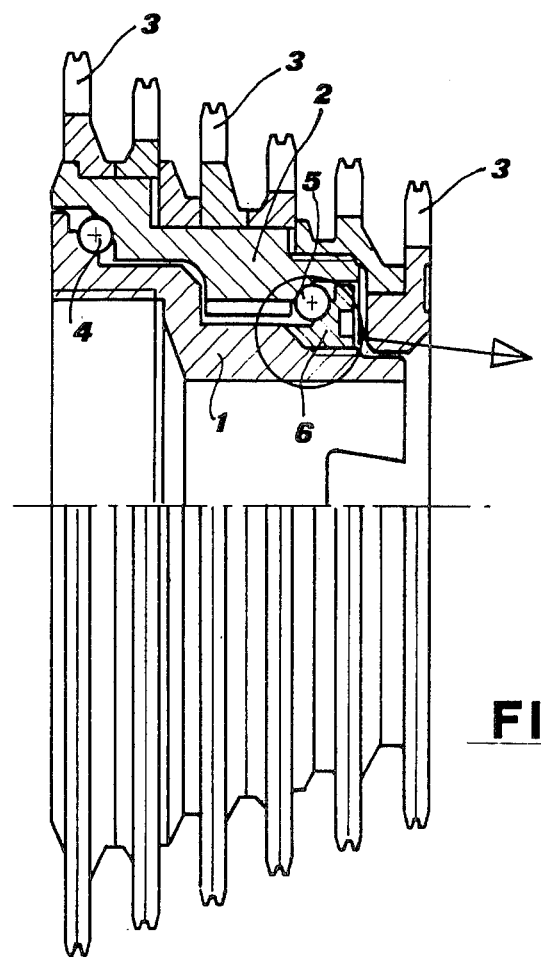
FIG. 1 is a side and axial cross-section view of the free-wheel according to the invention.
Figure 2:
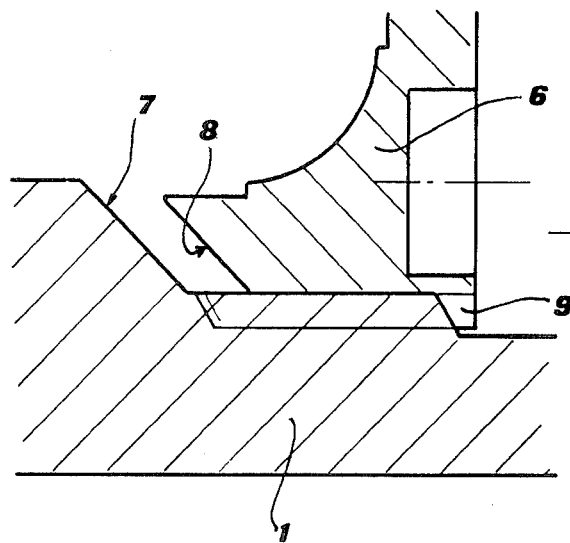
FIG. 2 is an enlarged cross-section of the detail of the adjustment cone.

With reference to the drawing, a free-wheel for bicycle wheels according to the invention comprises an inner body 1 to be assembled integrally with the hub of the rear wheel of a bicycle, an outer body 2 carrying the sprockets 3 of the chain drive, which is pedal-driven, and two circumferential sets of balls 4 and 5 by means of which the outer body 2 rolls on the inner body 1. The seat for the set of balls 4 is formed by specially shaped zones, corresponding to bodies 1 and 2, while the seat for the set of balls 5 comprises, besides a similar zone of the outer body 2, a specially shaped annular body 6, which is screwed on the inner body 1, the "cone".

As may be seen from the drawing, the inner body of the free-wheel according to the invention has a shoulder 7 with a conical surface, the axis of which coincides with the axis of rotation of the wheel. Also the adjustment cone has an opposed surface 8 of cone shape, whose axis likewise coincides with the axis of cone 6.

When the adjustment cone 6 is screwed on the body 1, by means of the threading 9, it is automatically centered on the axis of rotation because the conical surfaces 7 and 8 bear one against the other, thus completely eliminating possible faults generated by the radial tolerances of said threading 9.

As mentioned, the adjustment in the axial direction is obtained by producing adjustment cones 6 of various axial dimensions, sufficiently different to permit—through a suitable selection—perfect axial adjustment, without the interposition of any spacing elements.

I claim:

1. A freewheel for a bicycle, comprising an inner body integral with a wheel hub of the bicycle, an outer body carrying chain drive sprockets, two circumferential series of balls by which said outer body rolls on said inner body, one said set of balls having a seat on which the balls of said one set roll, said seat being screwthreadedly engaged on the inner body, and mutually engaging annular conical surfaces coaxial with the freewheel between said seat and said body.

2. A freewheel as claimed in claim 1, in which said annular conical surfaces are formed one directly on said seat and one directly on said body.

* * * * *